United States Patent [19]

Mori et al.

[11] Patent Number: 4,866,735
[45] Date of Patent: Sep. 12, 1989

[54] SPREAD SPECTRUM COMMUNICATING METHOD

[75] Inventors: Masaharu Mori; Masahiro Hamatsu, both of Tokyo, Japan

[73] Assignee: Clarion Co., Ltd., Tokyo, Japan

[21] Appl. No.: 222,181

[22] Filed: Jul. 21, 1988

[30] Foreign Application Priority Data

Jul. 31, 1987 [JP] Japan ................. 62-192218

[51] Int. Cl.$^4$ .............................................. H04K 1/04
[52] U.S. Cl. .................................. 375/1; H04K/1/04
[58] Field of Search .................... 375/1, 47; 380/34

[56] References Cited

U.S. PATENT DOCUMENTS

| 3,350,644 | 10/1967 | McNair | 375/1 |
| 4,561,089 | 12/1985 | Rouse et al. | 375/1 |
| 4,648,099 | 3/1987 | Kerr | 375/47 |
| 4,649,549 | 3/1987 | Halpern et al. | 375/1 |

Primary Examiner—Salvatore Cangialosi
Attorney, Agent, or Firm—Flynn, Thiel, Boutell & Tanis

[57] ABSTRACT

A spread spectrum communicating method does not use as a spreading code a normal PN code having a code length of an add number of chips in the original form, but uses a PN code having a code length of an even number of chips obtained by adding or subtracting a code of a predetermined number of chips to or from the original PN code to use it as the spreading code.

1 Claim, 3 Drawing Sheets

SPREAD SPECTRUM COMMUNICATING METHOD

FIELD OF THE INVENTION

This invention relates to a spread spectrum communicating method, and more particularly to an improvement in a method of producing a timing signal required for high-speed integrating operation of a correlation spike signal.

BACKGROUND OF THE INVENTION

FIG. 2 shows a spread spectrum receiver using a convolver as a correlator. In the drawing, reference numeral 1 refers to a convolver, 2 to an envelope detecting circuit, 3 to a high-speed integrating circuit, e.g. a known PDI (Post-Detection-Integration) circuit, 4 to a data demodulating circuit, and 5 to an integral operation timing signal generating circuit including a frequency dividing circuit, etc.

One of inputs of the convolver 1 is supplied with a received signal S1 which is a spread-spectrum signal obtained by multiplication of a spreading signal and an information signal and transmitted from a spread spectrum transmitter (not shown). The other input of the convolver 1 is supplied with a reference signal S2 produced from a spreading code including a PN code, etc. A correlation output from the convolver 1 is detected by the envelope detecting circuit 2, and a correlation spike signal S3 having a sharp waveform shown in FIG. 3 is outputted and used to perform code synchronization, data demodulation and other operations.

In FIG. 3, T1 equals one period length of a clock signal for generating a spreading code (hereinafter called "PN clock"), and T2 is the period at which correlation spike signals are outputted. When the code length of the spreading code is N chips, the following relationship is established:

$$T2 = \frac{N}{2} \cdot T1 \quad (1)$$

FIG. 3 shows a waveform of a correlation spike signal in an ideal condition. Actually, however, such spread spectrum communication is effected in a multipath fading or other bad condition, and the correlation spike signal shows a waveform as shown, for example, in Figure 4. In this circumstance, in order to ensure normal code synchronization, data demodulation and other operations also when the correlation spike signal exhibits such an undesirable waveform, a countermeasure is usually taken by integrating the correlation spike signal S3 having the waveform of Figure in the PDI circuit, i.e. in the high-speed integrating circuit 3 in FIG. 2, producing a signal S4 having the waveform of FIG. 5, applying it to the data demodulating circuit and obtaining a data output S5.

In order to obtain a high-speed integration signal output shown in FIG. 5 by integrating at a high-speed the correlation spike signal dispersed by multi-path fading as shown in FIG. 4, the integrating time must be longer (mT1) than T1 (m is a natural number). If high-speed integration signal outputs are obtained every mT1 interval, integration timing signals can be produced conveniently by a frequency dividing circuit having a simple arrangement configured to frequency-divide a PN clock signal into integer fractions.

When code synchronization, data demodulation or other operation is performed using such a high-speed integration signal output, the correlation spike signal generating timing and the timing of producing a high-speed integration signal output corresponding to the correlation spike signal must be synchronized as shown in FIG. 6 (example of m=2).

More specifically, the following relationship is required:

$$T2 = n \cdot (mT1) \quad (2)$$
$$= mn \cdot T1$$

where m and n are natural numbers satisfying $mn \geq 2$.

By comparing equations (1) and (2), a necessary condition the code length N (chips) of the spreading code is obtained, and N must satisfy:

$$N = 2mn \quad (3)$$

That is, the spreading code must have an even number of chips.

However, when a PN code having one period length Nm expressed by equation (4) is used (for example, maximum length linearly sequentially occurring code) as the spreading code, the code length of the spreading code becomes one period length Nm of the PN code. Apparently, this does not satisfy equation (3) as follows:

$$Nm = 2^i - 1 \text{ (odd number)} \quad (4)$$

where i is 3 or larger integer.

As explained above, when a PN code is used as the spreading code and the one period length of the PN code is used in the original form as the code length of the spreading code in a spread spectrum receiver, the circuit arrangement is large-scaled because:

(i) the circuit requires an additional complicated frequency divider to produce a timing signal for operation of the high-speed integration circuit; and (ii) the circuit requires a clock signal generating circuit for generating a clock signal different in frequency from the PN clock signal for generation of the PN codes.

OBJECT OF THE INVENTION

It is therefore an object of the invention to provide a spread spectrum communication method which solves the prior art problem by the use of a PN code satisfying equation (3) as a spreading code.

SUMMARY OF THE INVENTION

In order to achieve the object, the invention features the use of a PN code as a spreading code in a spread spectrum receiver which PN code has a code length of an even number of chips.

A PN code signal for producing the spreading code is frequency-divided to produce an operation timing signal for performing high-speed integration of a correlation spike signal.

DETAILED DESCRIPTION

Figure 1:
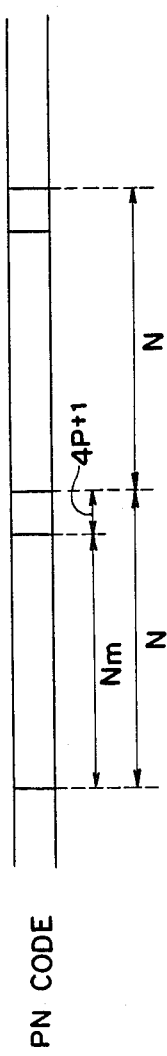
FIG. 1 is a diagram showing relationships among spreading code N, PN code length Nm and additional code length 4P+1.
Figure 2:
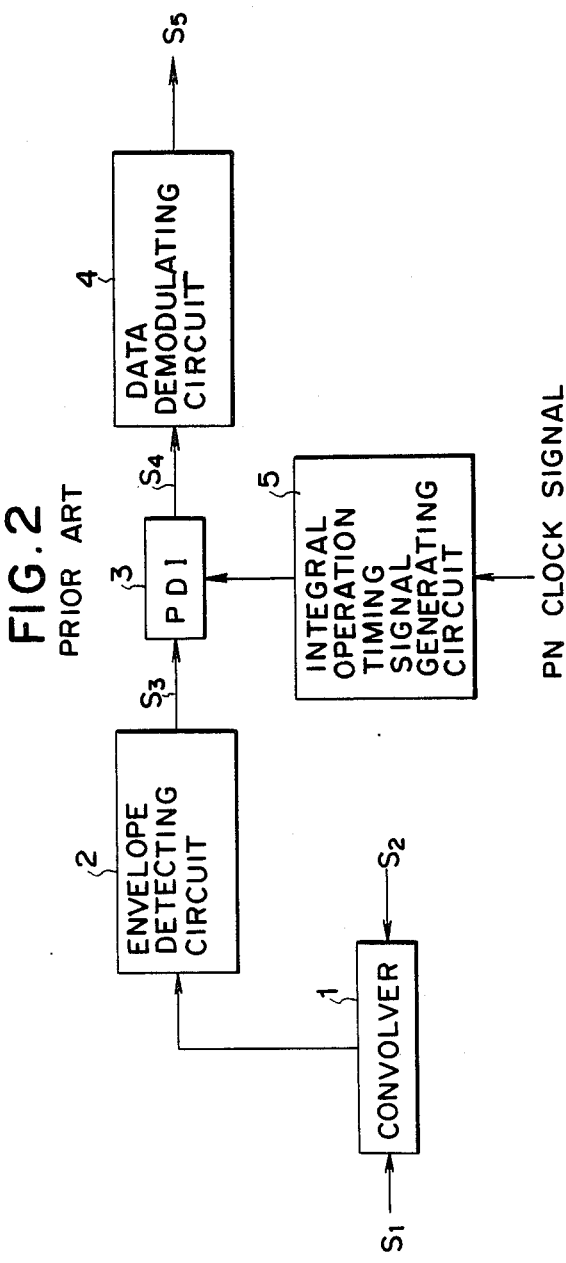
FIG. 2 is a block diagram showing a general arrangement of a spread spectrum receiver to which the invention is directed.
Figure 3:
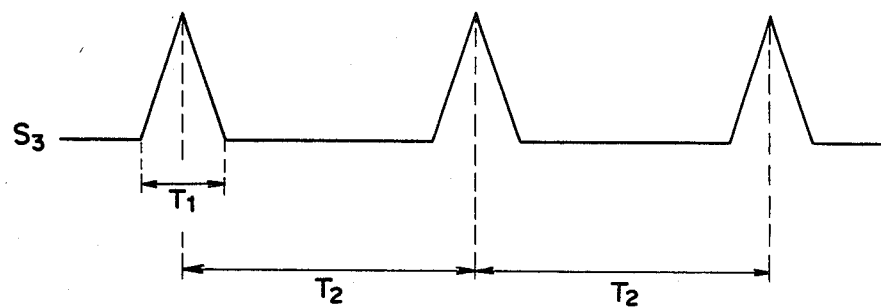
FIG. 3 shows the waveform of a correlation spike signal.
Figure 4:
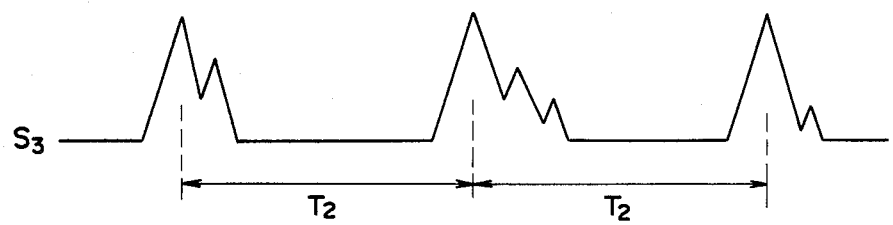
FIG. 4 shows the waveform of the correlation spike signal in presence of a multipath fading.
Figure 5:
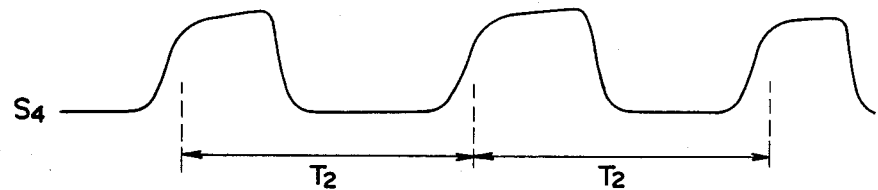
FIG. 5 shows the waveform of a high-speed integration signal output.
Figure 6:
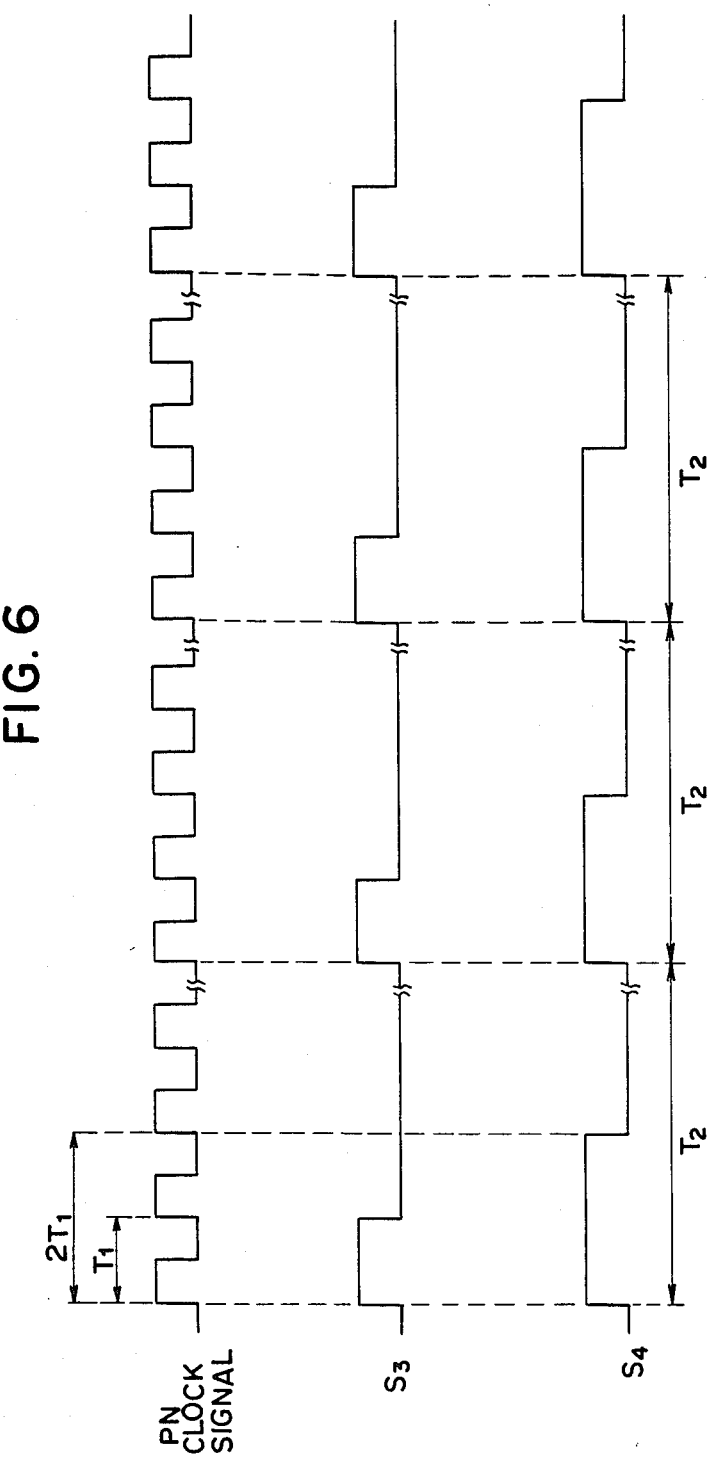
FIG. 6 is a timing chart showing relationships among a PN clock signal, correlation spike signal and high-speed integration signal.

The invention is described below, referring to a preferred embodiment illustrated in the drawings. In the following description, $m=2$ and $N=4n$ are selected in the aforegoing equation (3).

When the spreading code is made from a PN code of a code length of Nm chips and an additional code of a code length of $(4P+1)$ chips, the resulting code length Nm' is shown by:

$$Nm' = Nm + 4P + 1 \qquad (5)$$

where P is an integer.

By incorporating equation (4) into equation (5), the following equation is established:

$$\begin{aligned} Nm' &= 2^i - 1 + 4P + 1 \\ &= 4(2^{i-2} + P) \end{aligned} \qquad (6)$$

when $n = 2^{i-2} + P$ (7)

Nm' coincides with N of equation (3).

In equation (7), n indicates the timing period for generating a high-speed integration signal corresponding to a correlation spike signal.

For example, when selecting $i=7$ and $P=0$, definite values $Nm=127$, $Nm'=128$ and $n=32$ are obtained.

That is, by selecting a spreading code (code length of 128 chips) in which one chip code is added to the PN code of the code length of 127 chips, the timing period for generating a high-speed integration signal output corresponding to the correlation spike signal becomes every 32nd of high-integration signal outputs outputted at 2T1 interval.

FIG. 1 shows the relationship among spreading code length N, PN code length Nm and additional code length $4P+1$ added to Nm.

The code length and code pattern of the additional code may be selected as desired within a range not increasing the spurious level of the self-correlation characteristic of the spreading code.

As described above, since the inventive method uses a PN code as a spreading code which PN code is provided with a code length of an even number of chips by adding or subtracting a code of a suitable number of chips to or from an original PN code having a code length of an add number of chips, and since a PN clock signal for generating the spreading code is frequency-divided into a timing signal used for integration of a correlation spike signal, the system does not require a particular timing signal generating circuit (frequency divider), and enables scale and weight reduction of the spread spectrum receiver.

What is claimed is:

1. In a spread spectrum communicating method including steps that a transmitter transmits a spread spectrum signal obtained by multiplication of a spreading code and an information signal and that a receiver correlates the received spread spectrum signal with a spreading code generated therein, using a correlator made from a convolver, to obtain a correlation spike signal, and demodulates data from a signal obtained by integrating the correlation spike signal for a predetermined period in response to a PN clock signal for generating the spreading code, an improvement wherein said spreading code is a PN code having a code length of an even number of chips.

* * * * *